United States Patent [19]
Anderson et al.

[11] Patent Number: 5,809,178
[45] Date of Patent: Sep. 15, 1998

[54] ELIMINATION OF VISIBLE QUANTIZING ARTIFACTS IN A DIGITAL IMAGE UTILIZING A CRITICAL NOISE/QUANTIZING FACTOR

[75] Inventors: Eric C. Anderson, San Jose; George W. Dalke, Palo Alto, both of Calif.

[73] Assignee: Apple Computer, Inc., Cupertino, Calif.

[21] Appl. No.: 661,524

[22] Filed: Jun. 11, 1996

[51] Int. Cl.$^6$ .............................. G06K 9/38; H04N 1/40; H04N 1/409
[52] U.S. Cl. ..................... 382/251; 382/275; 358/445; 358/463
[58] Field of Search ................................ 382/268, 251, 382/239, 248, 250, 266, 275; 358/445, 463, 432, 433, 430; 348/403, 404, 405, 406, 420, 424, 425, 419

[56] References Cited

U.S. PATENT DOCUMENTS 4,774,574  9/1988  Daly et al. .............................. 348/406
5,654,760  8/1997  Ohtsuki ................................... 382/251

*Primary Examiner*—Scott Rogers
*Attorney, Agent, or Firm*—Sawyer & Associates

[57] ABSTRACT

A method and system eliminates visible quantizing artifacts in a digital image. The present invention eliminates visible artifacts by determining a function descriptive of a noise model for an input source of image data, utilizing a critical noise/quantizing factor in conjunction with the noise model function to determine a quantization function, and deriving optimum coding for the image data from the quantization function to produce digital image data lacking visible quantization artifacts. The critical noise/quantizing factor is a constant value found to be a value of ⅜. The present invention further includes deriving inverse coding for the optimum coding to allow processing of the digital image.

18 Claims, 2 Drawing Sheets

ELIMINATION OF VISIBLE QUANTIZING ARTIFACTS IN A DIGITAL IMAGE UTILIZING A CRITICAL NOISE/QUANTIZING FACTOR

FIELD OF THE INVENTION

The present invention relates generally to improving digital image output, and more particularly to eliminating visible quantizing artifacts in digital images.

BACKGROUND OF THE INVENTION

The ability to input images into computer systems has improved in recent years with the addition of image scanners and digital cameras to computer system environments. One desirable feature of these systems is that what you see on the input side of the system is accurately reproduced on the output side of the system, such as on a display device (e.g., a CRT) or printer.

In developing circuitry to produce an output image that corresponds to an input image, special consideration is typically taken to avoid having quantizing artifacts in the output image. Quantizing artifacts in digital images are normally characterized by contouring and banding in regions of slowly changing brightness. For color images, there may be additional banding resulting from different quantizing artifacts in each color channel. Normally, these quantizing artifacts cannot be eliminated once they are present in the digital images.

A common method for addressing these quantizing artifacts is to choose quantizing intervals and spacing so that the artifacts are unable to be seen. While The quantizing artifacts are not eliminated, the presumption is made that if they cannot be seen, they are not a problem. However, the visibility of these artifacts depends on the viewing transform, i.e., the transform that matches the input data to a specific output display or printing device.

Since there is not one single viewing transform, problems arise when the digital image is displayed or output on a device with a different transfer function. Problems also arise when attempts to alter the stored input of the digital image are made.

With the advent of software tools for manipulating digital images, such as Adobe™ Photoshop, computer users are better equipped to modify digital images and create new images. Unfortunately, these modifications, such as increasing the gain or changing the contrast or brightness, may reveal quantizing artifacts that were originally hidden by the aforementioned compensation techniques.

Accordingly, what is needed is a system that allows digital image manipulation and output on any given system without the possibility of quantizing artifacts becoming visible. The present invention addresses such a need and eliminates visible quantizing artifacts from digital images.

SUMMARY OF THE INVENTION

The present invention provides for a method and system that eliminates visible quantizing artifacts in a digital image. The present invention eliminates visible artifacts by determining a function descriptive of a noise model for an input source of image data, utilizing a critical noise/quantizing factor in conjunction with the noise model function to determine a quantization function, and deriving optimum coding for the image data from the quantization function to produce digital image data lacking visible quantization artifacts. The critical noise/quantizing factor is a constant value found to be a value of $3/8$. The present invention further includes deriving inverse coding for the optimum coding to restore the correct transfer function.

In utilizing the critical noise/quantizing factor, the present invention further includes determining the critical noise/quantizing factor. The determining of the critical noise/quantizing factor includes obtaining an input image of sufficient precision, adding noise to the input image of known distribution, and quantizing the input image into successively larger quantizing intervals until a quantizing artifact becomes visible. The quantizing interval revealing the quantizing artifact is the critical quantizing interval. The determining further includes applying an exhaustive variety of brightness and contrast transforms before the step of quantizing.

In addition, the present invention includes having the input source of a digital camera or alternatively a scanner. Further, the digital image produced is output on a CRT or printer.

With the present invention, an efficient and flexible system for eliminating visible quantizing artifacts in digital images is achieved. The processing of digital images produced in accordance with the present invention is ensured to not reveal visible artifacts in the image. Further, since the present invention is performed without dependency on a specific viewing transform, output on any given system also readily occurs without the possibility of quantizing artifacts becoming visible.

These and other advantages of the aspects of the present invention will be more fully understood in conjunction with the following detailed description and accompanying drawings.

DETAILED DESCRIPTION

Figure 1:
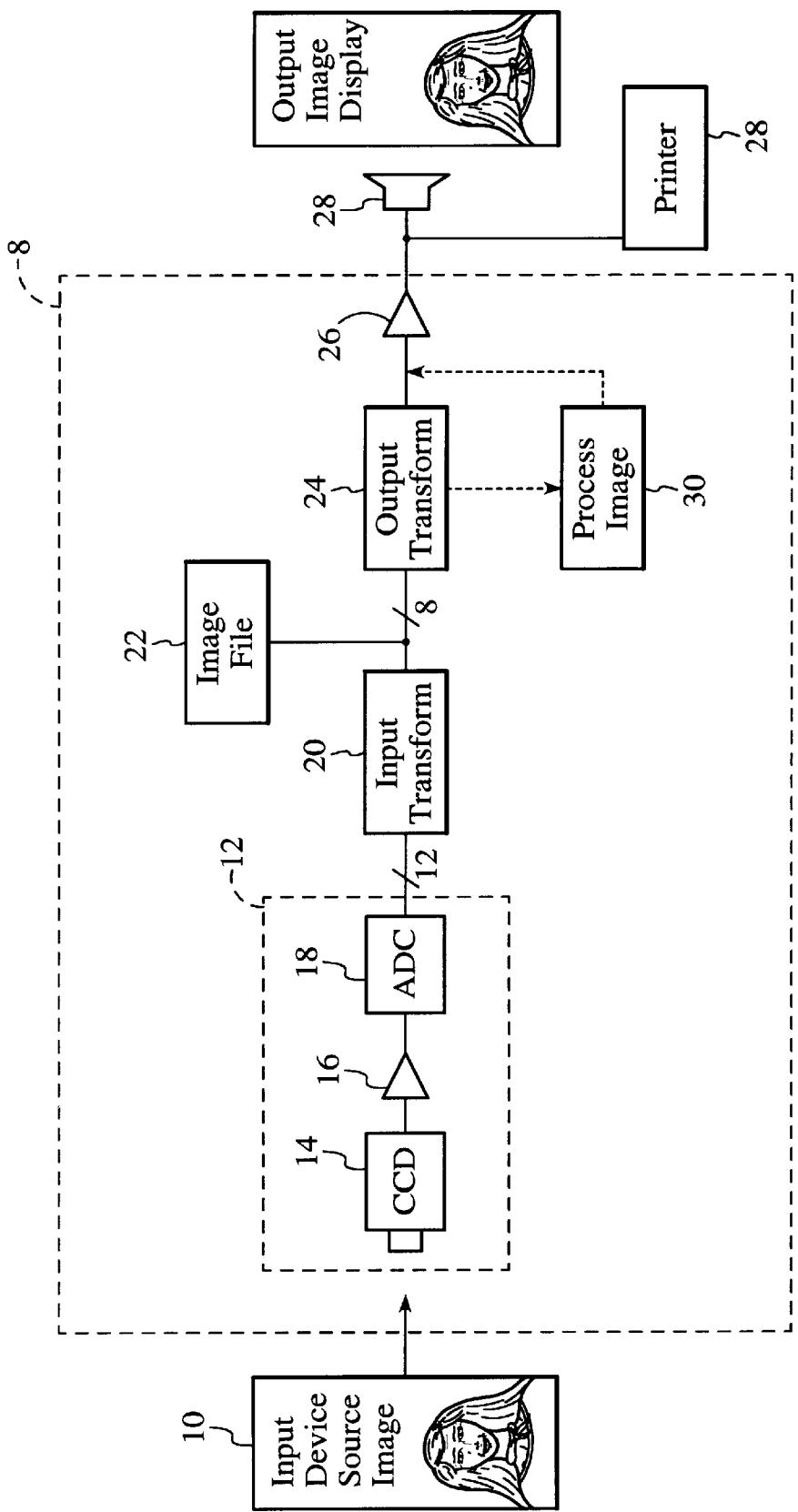
FIG. 1 illustrates a schematic arrangement of a system in accordance with the present invention that eliminates visible quantization artifacts.

The present invention relates to an improvement in digital image output by eliminating visible quantizing artifacts. The following description is presented to enable one of ordinary skill in the art to make and use the invention and is provided in the context of a patent application and its requirements. Various modifications to the preferred embodiment and the generic principles and features described herein will be readily apparent to those skilled in the art.

In the present invention, a system for producing an optimum coding for digital images is provided. Preferably, the optimum coding results in the fewest codes possible for which quantizing artifacts are eliminated. In determining the optimum coding, several factors are taken into account, as described more fully in the following and with reference to the figures.

In some typical systems, it is well-known that the addition of noise, such as dithering in printers, eliminates contours. The present invention enhances this idea by determining how much noise it takes to eliminate contours, and producing a table that gives noise versus signal level. Once the noise and signal level relationship is determined, the quantizing level as a function of noise is determined using a "critical noise/quantizing factor". For purposes of this disclosure, noise in a system preferably refers to the noise resulting from input CCD (charge coupled device) sensors, amplifiers, and other circuitry, as is well appreciated by those skilled in the art.

The "critical noise/quantizing factor" utilized in determining the quantizing level has been found from experiments performed in the following manner. Initially, a digital image of sufficient precision, i.e., lacking visible quantizing artifacts, is obtained. Next, noise of known distribution is added to the image. The image is then quantized to successively larger quantizing intervals until a slightly larger interval results in a quantizing artifact becoming visible. This level is then referred to as a critical quantizing level. Of course, the critical quantizing level, when determined in this manner, depends on the image data structure and is a function of the data amplitude and viewing transform. For a given image and noise distribution, tabulating the critical quantizing level for each data amplitude is defined herein as the "critical noise/quantizing" function.

Continuing with the experiment, repetition of the above steps is performed with a slight variation. Before each increase in the quantizing interval, an exhaustive variety of brightness and contrast transforms is applied. When there are no quantizing artifacts, regardless of the viewing transform, the quantizing interval is increased until the critical quantizing level is determined.

Interestingly, using this experimental procedure on a variety of data structures, the inventor has discovered that the resulting critical quantizing interval is the same regardless of the data amplitude, and therefore, the critical quantizing interval depends only on the noise. Thus, the constant is referred to as the "critical noise/quantizing factor" and has been found by the inventor to be $3/8$.

With this critical noise/quantizing factor determined, once the noise function from all the sources is also determined, the quantizing function can be determined, since the noise function is equal to the quantizing function multiplied by the quantizing factor. With the quantizing function determined, the quantizing levels or optimum coding are ensured as falling below the noise levels for which the contours are compensated. Thus, visible quantizing artifacts are substantially eliminated in the digital input image. Further, with the input transform developed independently of the viewing transform of the output device and user's perception, the input image is successfully stored and capable of being manipulated without revealing hidden quantization artifacts.

FIG. 1 illustrates a schematic arrangement of a system in accordance with the present invention that eliminates visible quantization artifacts. A source image is input to an image/computer processing system 8 via an input device 10, such as a digital camera or scanner. A sensor 12 preferably receives the input source image and includes a CCD (charge coupled device) 14, amplifier 16, and analog to digital converter (ADC) 18, as is well known to those skilled in the art.

An input transform function 20, developed in accordance with the present invention and using the critical noise/quantizing factor, transforms or codes the input data, e.g., 12-bit data, to image file data 22 and suitably eliminates quantizing artifacts in the input data. Image file data 22 is suitably stored as 8-bit data, for example, in a storage device, such as a hard disk drive, floppy disk drive, or other storage device. An output transform 24 preferably provides the inverse transform of the input function 20 concatenated with the viewing transform required by the output device, i.e., decoding of the image file data, to provide appropriate signals via an amplifier 26 to an output device 28, such as a CRT display or printer.

Of course, in such an environment, the image file data 22 may be altered by a user, such as to change the gain, contrast, or brightness, of the image. The processing of the image file data 22 is represented by block 30. Since the input transform 20 and correspondingly, the output transform 24, are preferably developed using the critical noise/quantizing factor in accordance with the present invention, such processing does not reveal quantizing artifacts.

Figure 2:
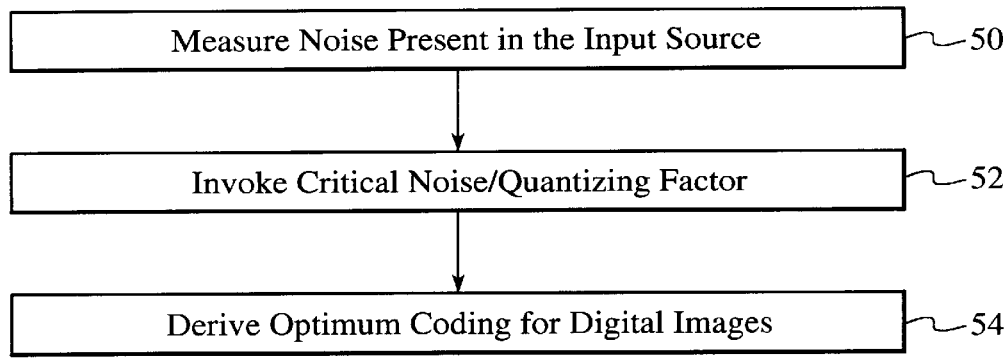
FIG. 2 illustrates a flow diagram of a preferred sequence for developing an input transform that eliminates visible quantizing artifacts.

The flow diagram of FIG. 2 illustrates a flow diagram of a preferred sequence for developing an input transform that eliminates visible quantizing artifacts. The sequence includes identifying the noise introduced by the input image sources, via step 50. The noise is suitably identified by measuring directly, e.g., by inputting light at a known intensity level, measuring the fluctuations, changing the intensity, reading the fluctuations, and so on, until the entire range of light intensity is exhausted and the data needed to identify the noise versus input signal level is collected. Alternatively, when the transfer functions for each noise source, such as light, the CCD, amplifiers, circuit board, etc., are known, they are suitably combined to produce the noise versus intensity data.

Once the noise data is known, the critical noise/quantizing factor is invoked, via step 52, and the optimum coding for the digital image is derived, via step 54, according to the relationship that the quantization function for producing the optimum coding is equal to the noise function divided by the quantizing factor.

By way of example, suppose image data has a signal amplitude x=(0,1). Amplitude related noise for the data is known to be noise function, s(x). As stated earlier, it has been found that the critical quantization function, q(x), is related to the noise function, s(x), by the critical noise/quantizing factor k, such that q(x)=s(x)/k.

For a CCD sensor having a noise model with a fixed noise of "r" decibels and an electron well capacity of "c", the noise function is $s(x)=10^{r/20}+(1/c)^{1/2}$, as is well appreciated by those skilled in the art. The resulting equation for the quantization function q(x) is $q(x)=(10^{r/20}+(1/c)^{1/2})/k$.

An interval $x_i$ is then suitably defined recursively as follows:

$x_1 = 0$ $x_2 = x_1 + q(x_1)$

. . .

$x_i = X_{i-1} + q(x_{i-1})$

. . .

$x_n = X_{n-1} + q(x_{n-1}); x \leq 1$, where $q(x_i) = s(x_i)/k$.

The sequence is preferably terminated at "n" when amplitude $x_n$ equals or exceeds the upper limit of 1 for the input image data signal. Of course, the maximum index "n" is preferably the number of codes required to digitize the input image without quantizing effects. Suitably, the number of bits "b" required to accommodate "n" codes is b=integer $(1+\log_2 n)$.

The value of "n" immediately becomes the criteria for how many bits are needed. Thus, when building a digital camera of known noise value, the number of bits and therefore, the number of data paths, can be suitably calculated. Accordingly, when it is determined that fewer bits are needed, a reduction in the number of data paths used is appropriately done, thus reducing the cost.

In order to convert a digital signal "x" to "n" digital codes, a digital lookup or encoding table is preferably used (i.e., input transform 20, FIG. 1). Table entries y(x) for the encoding table are suitably represented by the following:

$y(x)=0, x \leq x_2$;
$y(x)=1, x_2 < x \leq x_3$;
. . .
$y(x)=n-1, x_{n-1}, < x \leq x_n$.

Correspondingly, an inverse lookup or decoding table (i.e., output transform 24, FIG. 1) is used to restore the codes to the original data function before displaying or processing. Table entries z(y) for the decoding table are suitably represented by the following:

$z(y)=x_0, y=0$;
$z(y)=x_1, y=1$;
. . .
$z(y)=x_{n-1}, y=n-1$.

For a further example, the input data space may be linear and an output display may require gamma correction. For such a situation, the functional transform would suitably be included in the decoding table. Thus, if the transform is represented by f(x), the decode table entries are suitably represented as follows:

$z(y)=f(x_0), y=0$;
$z(y)=f(x_1), y=1$;
. . .
$z(y)=f(x_n), y=n-1$.

Before optimum coding with the input transform, the input digitizer 18 must have sufficient precision to avoid introduction of quantizing artifacts. For a linear digitizer, the minimum number of codes or quantizing levels, $q_{min}$, is suitably calculated with $q_{min}=\min(q(x))$. The required number of bits, "$b_d$", for the linear digitizer is thus, $b_d$=integer $(1+\log_2(1/q_{min}))$, while the number of bits "b" for the lookup table is the same as that described above, namely, b=integer $(1+\log_2 n)$.

In a situation that a function f(x) is chosen rather than the optimum coding for the input transform, conditions that produce quantizing artifacts are suitably determined. The determination is done via:

$f(i+q_i) \geq 1+f(i)$, for all i, where i is an input value, and $q_i$ is the critical quantizing level for the $i^{th}$ input value.

If the determination is successful for all input values, i, then there will be no visible quantizing artifacts. If the determination fails, then a greater amount of precision is necessary for the chosen function f(x).

The advantageous use of the present invention also arises in a system that has a known noise function and utilizes a suitable input transform but with quantizing artifacts. Using the "critical noise/quantizing" factor, or ⅜ rule, the quantizing intervals of the input transform are suitably used to derive what the noise function should be to eliminate contours. Thus, the difference between the known noise function and the derived necessary noise function indicates the amount of additional noise required to eliminate contours. The needed amount of noise is then suitably added in a nonlinear fashion, i.e., by adding in variable amplitude noise, to achieve a more accurate noise distribution in the system while eliminating contours.

By way of example, suppose a signal source "x" requires coding with a transform function "f" and an output precision "p". Then:

$n_p=2^{p-1}$, is the number of output levels;
$y(x)=\text{integer}(0.5+n_p * f(x))$;
$qf(i)=y(i)-y(i-1)$; and
$s(i)=k * qf(i)$, where s(i) is the required noise for each input level, and "k" is "critical noise/quantizing factor".

Figure 3:
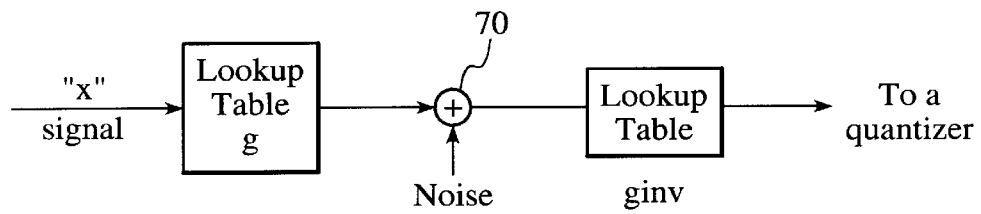
FIGS. 3 and 4 illustrate representations of suitable methods for adding noise.
Figure 4:
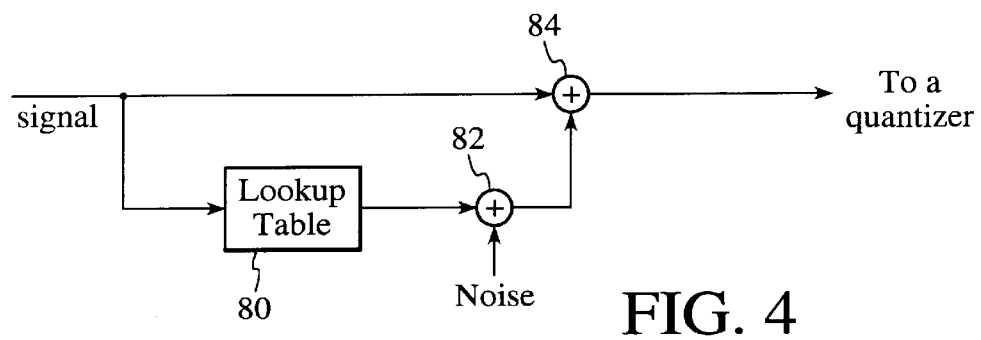

FIG. 3 illustrates a representation of a suitable method for adding noise by transforming the data "x" by a lookup table "g", adding in linear noise via an adder 70, and then decoding through a lookup table $g_{inv}$. Alternatively, FIG. 4 illustrates another representation of a suitable method for adding noise. As shown, a suitable lookup table 80 may generate the required noise for each input level n(i) to multiply with the noise source via multiplier 82, the results of which are then added via adder 84 to the data signal before proceeding to the quantizer.

Although the present invention has been described in accordance with the embodiments shown, one of ordinary skill in the art will recognize that there could be variations to the embodiment and those variations would be within the spirit and scope of the present invention.

For example, a situation in which a better detector, i.e., one with lower noise, is made available and used for a given input device could alter the required quantization levels. If the current system is already working at levels much higher than this, there would be no problem with quantization artifacts becoming visible. However, if the levels are lower, some quantizing artifacts may arise as the noise level drops with the new detector. Fortunately, with the use of the critical noise/quantizing factor, as described herein, the necessary coding for the reduced noise detector is easily and directly calculated. If there is not sufficient precision to eliminate quantizing artifacts, then the effects are suitably minimized by increasing the critical quantizing factor, k, until the number of codes matches the precision.

Accordingly, many modifications may be made by one of ordinary skill without departing from the spirit and scope of the present invention, the scope of which is defined by the following claims.

We claim:

1. A method for eliminating visible quantizing artifacts in a digital image, the method comprising:

(a) determining a function descriptive of a noise model for an input source of image data;

(b) utilizing a critical noise/quantizing factor in conjunction with the noise model function to determine a quantization function; and (c) deriving optimum coding for the image data from the quantization function to produce digital image data lacking visible quantization artifacts.

2. The method of claim 1 wherein the critical noise/quantizing factor is a constant value.

3. The method of claim 2 wherein the constant value is ⅜.

4. The method of claim 1 further comprising deriving inverse coding for the optimum coding to allow processing of the digital image.

5. The method of claim 1 wherein the utilizing step (b) further comprises the step of (b1) determining the critical noise/quantizing factor.

6. A method for eliminating visible quantizing artifacts in a digital image, the method comprising:

(a) determining a function descriptive of a noise model for an input source of image data;

(b) utilizing a critical noise/quantizing factor in conjunction with the noise model function to determine a quantization function including determining the critical noise/quantizing factor by
    obtaining an input image of sufficient precision;
    adding noise to the input image of known distribution; and quantizing the input image into successively larger quantizing intervals until a quantizing artifact becomes visible, wherein the quantizing interval revealing the quantizing artifact is the critical quantizing interval; and (c) deriving optimum coding for the image data from the quantization function to produce digital image data lacking visible quantization artifacts.

7. The method of claim 6 further comprising the step of applying a plurality of brightness and contrast transforms before the quantizing step.

8. A system for eliminating visible quantizing artifacts in a digital image, the system comprising:

a circuit for:

determining a function descriptive of a noise model for an input source of image data;

utilizing a critical noise/quantizing factor in conjunction with the noise model function to determine a quantization function; and deriving optimum coding for the image data from the quantization function to produce digital image data lacking visible quantization artifacts.

9. The system of claim 8 wherein the critical noise/quantizing factor is a constant value.

10. The system of claim 9 wherein the constant value is ⅜.

11. The system of claim 8 further comprising deriving inverse coding for the optimum coding to allow processing of the digital image.

12. The system of claim 8 wherein the input source comprises a digital camera.

13. The system of claim 8 wherein the input source comprises a scanner.

14. The system of claim 8 wherein a CRT outputs the digital image produced.

15. The system of claim 8 wherein a printer outputs the digital image produced.

16. The system of claim 8 wherein utilizing the critical noise/quantizing factor further comprises determining the critical noise/quantizing factor.

17. A system for eliminating visible quantizing artifacts in a digital image, the system comprising:

a circuit for:

determining a function descriptive of a noise model for an input source of image data;

utilizing a critical noise/quantizing factor in conjunction with the noise model function to determine a quantization function including determining the critical noise/quantizing factor by obtaining an input image of sufficient precision; adding noise to the input image of known distribution; and quantizing the input image into successively larger quantizing intervals until a quantizing artifact becomes visible, wherein the quantizing interval revealing the quantizing artifact is the critical quantizing interval; and deriving optimum coding for the image data from the quantization function to produce digital image data lacking visible quantization artifacts.

18. The system of claim 17 further comprising the step of applying an exhaustive variety of brightness and contrast transforms before quantizing the input image.

* * * * *